United States Patent [19]
Toda et al.

[11] Patent Number: 5,144,581
[45] Date of Patent: Sep. 1, 1992

[54] APPARATUS INCLUDING ATOMIC PROBES UTILIZING TUNNEL CURRENT TO READ, WRITE AND ERASE DATA

[75] Inventors: Akitoshi Toda, Kunitachi; Ryouhei Shimizu, Koshigaya; Hiroko Ohta, Hachioji; Hiroshi Kajimura, Tokyo; Yoshiyuki Mimura, Hachioji; Yasuo Isono, Fussa; Toshihito Kouchi, Tama, all of Japan

[73] Assignee: Olympus Optical Co., Ltd., Tokyo, Japan

[21] Appl. No.: 471,854

[22] Filed: Jan. 29, 1990

[30] Foreign Application Priority Data

Feb. 9, 1989 [JP] Japan .................................. 1-30340
Feb. 14, 1989 [JP] Japan .................................. 1-32760

[51] Int. Cl.$^5$ ...................... G11C 11/00; G11C 13/00; G11B 9/00
[52] U.S. Cl. ................................... 365/151; 365/174; 365/189.01; 369/126; 250/306; 346/134
[58] Field of Search ................ 365/151, 174, 189.01; 369/126, 144, 276; 357/6, 8; 250/306; 346/134

[56] References Cited

U.S. PATENT DOCUMENTS

| | | | |
|---|---|---|---|
| 4,343,993 | 8/1982 | Binnig et al. | 250/306 |
| 4,575,822 | 3/1986 | Quate | 365/174 |
| 4,724,318 | 2/1988 | Binnig | 250/306 |
| 4,829,507 | 5/1989 | Kazan et al. | 369/126 |
| 4,831,614 | 5/1989 | Duerig et al. | 365/174 |
| 4,945,515 | 7/1990 | Ooumi et al. | 365/174 |
| 4,956,817 | 9/1990 | West et al. | 365/151 |
| 4,962,480 | 10/1990 | Ooumi et al. | 365/151 |

FOREIGN PATENT DOCUMENTS

0272935 6/1988 European Pat. Off. ............ 365/151
0334677 9/1989 European Pat. Off. ............ 365/151

OTHER PUBLICATIONS

Stern et al., "Deposition and Imaging of Localized Charge on Insulator Surfaces Using a Force Microscope", Applied Physics Letters, vol. 53, No. 26, Dec. 26, 1988, pp. 2717-2719.
IBM Technical Disclosure Bulletin, vol. 8, No. 2, Jul. 1965, pp. 217-219; J. Rocca: "Buffer Storage Device".
Physical Review Letters, "Surface Studies by Scanning Tunneling Microscopy", G. Binning et al., vol. 49, Jul. 5, 1982, pp. 57-61.
1986 American Vacuum Society, "Lithography with Scanning X Tunneling microscope", M. A. McCord, pp. 86-88.

Primary Examiner—Glenn Gossage
Attorney, Agent, or Firm—Frishauf, Holtz, Goodman & Woodward

[57] ABSTRACT

A micro scanning tunneling microscope ("STM") arithmetic circuit device comprises an information-rewritable micro STM recording medium and a micro STM recording apparatus which temporarily stores information on the recording medium such that the information can be read as a variation in a tunnel current. The recording apparatus has a probe (probes) for writing/reading information on the recording medium and a scanner for varying a relationship in position between the probe and the recording medium. The micro STM recording apparatus uses a recording medium having a specific format as the micro STM recording medium in which recorded information is read as a variation in a tunnel current. That is, the recording medium has an address area in which address information is recorded and a data area in which data information is recorded.

7 Claims, 8 Drawing Sheets

APPARATUS INCLUDING ATOMIC PROBES UTILIZING TUNNEL CURRENT TO READ, WRITE AND ERASE DATA

BACKGROUND OF THE INVENTION

1. Field of the Invention

The present invention relates to the technique of processing data recorded in the form of an arrangement of atoms or molecules, by using an atomic probe incorporated in a system, such as a scanning tunneling microscope (STM), which is designed to form a three-dimensional image showing atomic structure. In the case of an STM, a tunnel-current probe is used as the atomic probe. In the case of an atomic force microscope (AFM), an atomic force probe is used as the atomic probe. In magnetic domains, a magnetic force probe is used as the atomic probe. The STM, which can read data in the form of an arrangement of atoms, comprises a very small piezoelectric-element driven cantilever made by an integrated circuit ("IC") process and measuring 1 mm×200 μm×5 μm, and a sharp probe also made by an IC process and attached to free end of the cantilever. This STM, generally known as cantilever-type STM or micro STM, is used along with a specific data-recording medium, thus constituting a so-called microelectronic device. More specifically, the present invention relates to, for example, a circuit having a temporary storage area using a micro STM and, more particularly, to a micro STM arithmetic circuit device constituting circuits such as a sampling circuit, a delay circuit, a shift register, and a bit inversion circuit. The present invention also relates to a micro STM recording apparatus which enables reading or writing of information using a micro STM and to a micro STM recording medium for us with the micro STM recording apparatus.

2. Description of the Related Art

Heretofore, various constituent elements for electronic circuits have been proposed as is well known. These elements have been improved in performance, size, cost, and stabilization.

In recent years, on the other hand, applications of the scanning tunneling microscope (STM) invented by Binning, Rohrer, et al. to various fields have been studied. The STM is disclosed in an article entitled "Surface Studies by Scanning Tunneling Microscope" by G. Binning, H. Rohrer, Ch. Gerber, and E. Weibel, Physical Review Letters, Vol. 49, No. 1, pp 57–61 (Jul. 5, 1982). That is, when a direct-current voltage is applied between a sample and a tunnel current probe with the tip of the probe placed at a distance of several nanometers from the sample surface, electrons travel between the sample surface and the probe because of the tunnel effect. The STM utilizes the phenomenon.

More specifically, the STM is processed such that the tip of the tunnel current probe is sharpened to be less than 1 μm and one atom of atoms constituting the probe protrudes from its portion approaching the atomic structure of the sample. A servo circuit is added to a detector for detecting a tunnel current flowing between the probe and the sample so as to drive a piezoelectric actuator for controlling the probe-to-sample distance. The probe is scanned two-dimensionally along the surface of the sample. Thereby, the STM can output variations in the tunnel current and the atomic structure as a three-dimensional space. In this type of STM, the up-and-down motion of the probe corresponds to the atomic structure profile of the sample.

It has also been found that the tunnel current flowing between the probe and the sample depends upon the probe-to-sample distance and the work functions of substances constituting the probe and the sample. Thus, the current obtained from the probe scanning the sample varies in response to irregularities formed on the sample, the kind of atoms constituting the substance of the sample, or electric charges trapped in the vicinity of the sample surface.

On the other hand, an attempt has been made to directly draw a pattern on a silicon substrate by means of the STM. For example, in an article entitled "Lithography with the Scanning Tunneling Microscope" by M. A. McCord and R. F. W. Pease, J. Vac. Sci. Technol. B. Vol. 4, No. 1 Jan/Feb 1986, pp. 86–88, it is reported that tracks were engraved on a thin film of gold deposited on a silicon substrate by scanning an STM at an applied energy of 10 eV. In the same journal, a report is made on a write line formed on a 10-nm thick Langmiur Blodgett (LB) film of decosenoic acid by means of a beam of 25 V and 12 nA.

Furthermore, such a micro STM as announced under the title of "A Planar Process for Microfabrication of STM" by C. F. Quate, M. J. Zdeblick, T. R. Albrecht, and S. Akamine at the University of Stanford in the Third International Conference on Scanning Tunneling Microscope (Oxford 4–8 July, 1988) includes an extremely small piezoelectric-element driven cantilever which measures 1 mm×200 μm×5 μm and uses ZnO made by an IC process as a piezoelectric element and a sharp probe evaporated onto the tip of the cantilever using a small hole as a mask by an IC process.

C. F. Quate invented an STM memory using the micro STM in which the displacement (representing the presence or absence of recorded information) on the scanning surface of a sample (recording medium) or in the neighborhood of the surface of the sample is read as a variation in tunnel current by scanning the probe, the STM memory being now patented under U.S. Pat. No. 4,575,822, entitled "METHOD AND MEANS FOR DATA STORAGE USING TUNNEL CURRENT DATA READOUT". The STM can attain an incomparable recording density. Thus it is possible to make a sample (recording medium) on which information is recorded very small as compared with recording mediums used in conventional information recording apparatuses.

However, though having described the formation of a micro STM memory using a cantilever type of micro STM as described above, C. F. Quate has disclosed none of formats for recording information.

In addition, no attempt has been made to apply such a micro STM as described above to various types of arithmetic circuit devices constituting electronic circuits.

The probe used in the AFM has one atom on its tip, like the probe incorporated in the STM. This atom interacts with the atoms placed on the recording medium and recognized as protrusions representing data, thus generating Coulomb force or Van der Waals force, thereby reading the data. Like the STM probe, the AFM probe is servo-controlled by means of a piezoelectric element, whereby the gap between the tip of the probe and the surface of the recording medium is maintained. The AFM probe can be incorporated into the micro STM cantilever described above. It can be used in place of the magnetic force probe which is applied to read data from magnetic domains. The tip of the AFT probe can be made of artificial diamond vapor-deposited on the free end of a cantilever. If this is the case, the AFT probe can accurately read data from the atoms placed on the surface of the recording medium, while being driven by drive pulses.

SUMMARY OF THE INVENTION

It is a primary object of the present invention to provide an electronic circuit including an atomic probe.

More specifically, it is a first object of the present invention to provide an atomic probe arithmetic circuit device for constituting a circuit having a tiny area with a large temporary storage capacity by the utilization of a feature that micro STM, AFM, etc. can be integrated into a small size while still utilizing an incomparable large recording density of STM and the like.

It is a second object of the present invention to provide an atomic probe recording apparatus and an atomic probe recording medium therefor which permit random access to data information in an atomic probe memory, solve complexities of control for retrieval of address information, and enable high-speed retrieval of address information.

It is a third object of the present invention to avoid the worst case in which address data is changed by data information recording mean or physical phenomena similar thereto and thus data in address information part becomes abnormal even though data in data information part is normal with the result that readout of information by an atomic probe recording apparatus becomes impossible. In other words, the third object of the present invention is to provide an atomic probe recording apparatus in which data has high integrity and an atomic probe recording medium therefor.

To attain the first object, an atomic probe arithmetic circuit device of the present invention uses an atomic probe as a recording apparatus and temporarily records information, in the form of electrical charge, magnetism, or thermal strain, on a recording medium used with the recording apparatus. By temporarily storing input information on the recording medium, a micro arithmetic circuit device can be provided which is capable of performing the same operations as many electronic circuits involving a process of temporarily storing input information.

Furthermore, to attain the second object, a micro STM recording apparatus and an atomic probe recording medium used with the recording apparatus according to the present invention separate an information storage area of the recording medium into an address area and a data area. In the respective address and data areas, address information and data information can be written or read as a variation in a tunnel current in an STM, or as a variation in an inter-atom force in an AFM. By specifying a record format of information in this way, given data information can be read at random and the location of address information in an address area can be clarified. Thus, an atomic probe recording apparatus and an atomic probe recording medium are provided which are improved in retrieval capability for address information.

To attain the third object, the atomic probe recording medium is recorded with address information by a method different from that by which data information is recorded in the data area, in addition to the above arrangements. Thereby, even in the case where part of data information is destroyed by noise at the time of writing of data, the address information can be made hard to change. Even if changed, the address information can be refreshed easily. If the address information becomes degraded due to noise, or due to recording data which was written on the address data, for example, the original and correct address data can be recreated, or "refreshed". Thus, an atomic probe recording apparatus and an atomic probe recording medium are provided which can avoid the worst case in which the address information is made unreadable by noise and recorded data cannot be accessed and read even though data is not damaged. That is, according to the atomic probe recording apparatus and the atomic probe recording medium, data information corresponding to address information can be read surely.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

In embodiments of the present invention which will now be described with reference to the accompanying drawings, an STM using a tunnel-current probe is disclosed. Nevertheless, the present invention can be applied to an AFM or an MFM (Magnetic-Force Microscope).

DETAILED DESCRIPTION OF THE PREFERRED EMBODIMENTS

Figure 1:
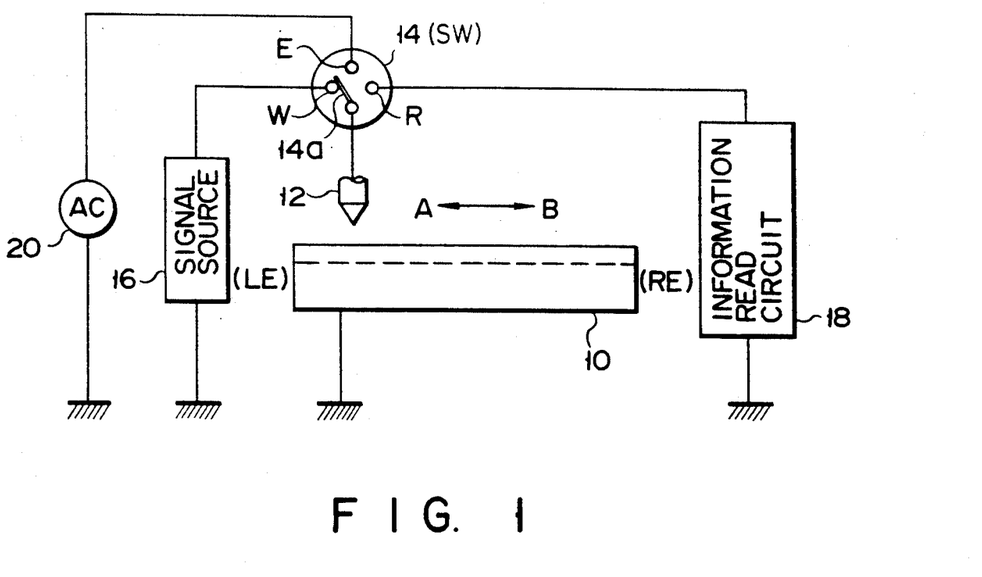
FIG. 1 is a schematic block diagram of an embodiment of a micro STM arithmetic circuit device of the present invention.

FIG. 1 illustrates a sampling circuit using a micro STM arithmetic circuit device of the present invention by way of example. An information-rewritable micro STM recording medium 10 is subjected to writing, reading, or erasing by a tunnel current probe 12.

Tunnel current probe 12 is placed at a constant distance from micro STM recording medium 10 and arranged to scan the medium in directions of arrows A and B. Probe 12 is connected to a signal source 16 when a moving contact 14a of a change-over switch (SW) 14 is placed in the write (W) position. When connected to signal source 16, probe 12 writes information from signal source 16 onto STM recording medium 10 continuously or in the form of pulses during scanning. When moving contact 14a of change-over switch 14 is placed in the read (R) position, probe 12 is connected to an information read circuit 18. By this connection, probe 12 reads information from micro STM recording medium 10 in the form of variations in tunnel current during scanning. Moreover, when moving contact 14a of changeover switch 14 is placed in the erase (E) position, probe 12 is connected to an alternating current source 20. When this connection is made, probe 12 erases information recorded on micro STM recording medium 10 during scanning. To erase information, a voltage opposite to that at the time of writing may be applied to probe 12.

FIGS. 2A through 2F are timing diagrams of an example in which an analog signal is sampled by the sampling circuit arranged as described above. As can be seen from the timing diagrams, by performing writing, reading, and erasing information in succession in predetermined scanning intervals, a sample can be extracted from an original analog signal. More specifically, writing is performed during an interval of scanning (refer to FIGS. 2B and 2C) by probe 12 from the left end (LE) to the right end (RE) of micro STM recording medium 10, i.e., in the direction of arrow B, reading is performed during an interval of scanning (refer to FIG. 2D) from the left end (LE) to the right end (RE) of the medium, and erasing is performed during an interval of scanning (refer to FIG. 2E) from the right end (RE) to the left end (LE) of the medium, i.e., in the direction of arrow A. By repeating this process, the original analog signal (refer to FIG. 2A) is sampled at regular intervals (refer to FIG. 2F). That is, by temporarily storing partial information of the original signal on micro STM recording medium 10 with tunnel current probe 12, a sampling circuit using a micro STM can be implemented.

Figure 2A:
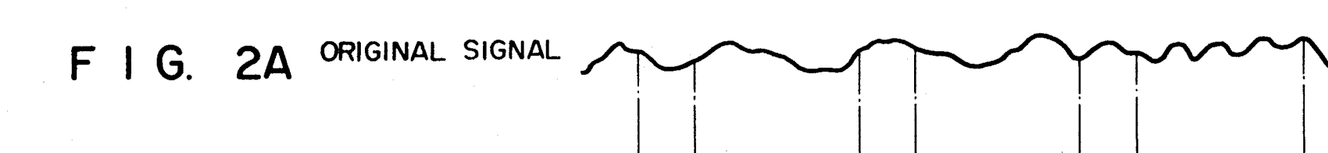
FIGS. 2A (through 2F are timing diagrams for use in explanation of the operation of the micro STM arithmetic circuit device of FIG. 1 used as a sampling circuit.
Figure 2B:
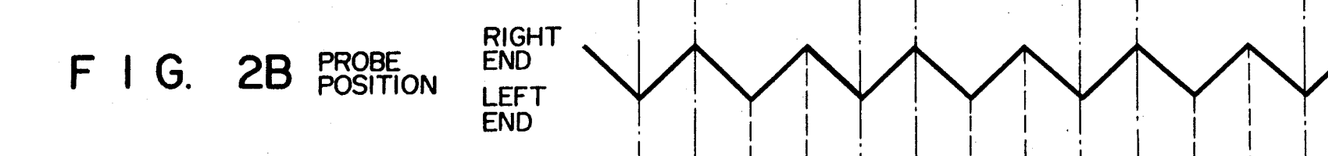
Figure 2C:
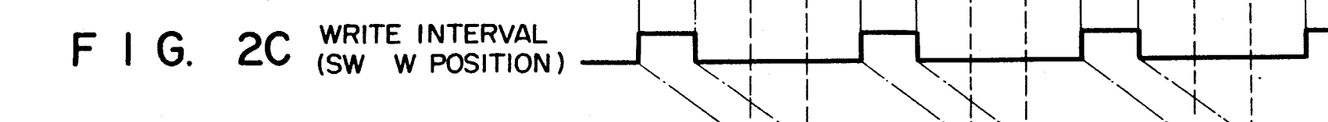
Figure 2D:
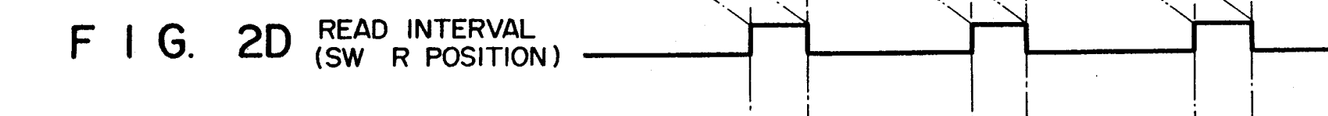
Figure 2E:
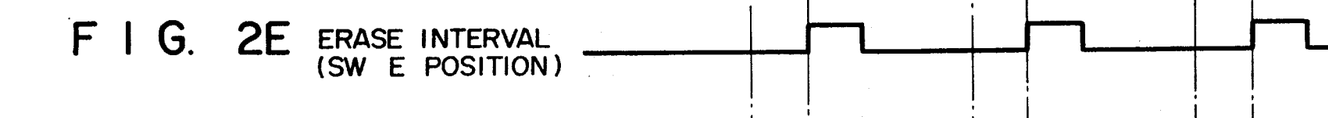
Figure 2F:
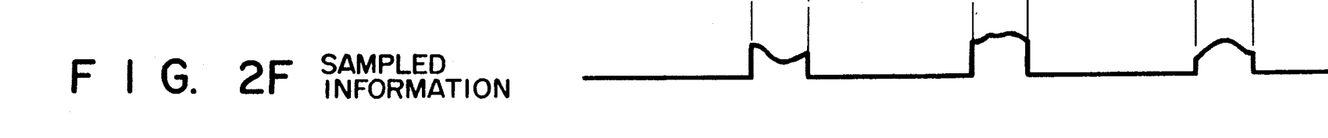

For a repeated signal, the scanning by probe 12 may be synchronized with the input signal.

Figure 3A:
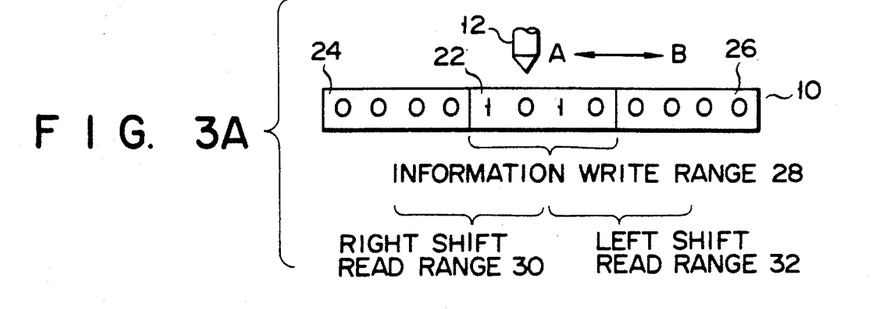
FIG. 3A, is a diagram for illustrating how written information is arranged when the micro STM arithmetic circuit device of FIG. 1 is used as a shift register.
Figure 3B:
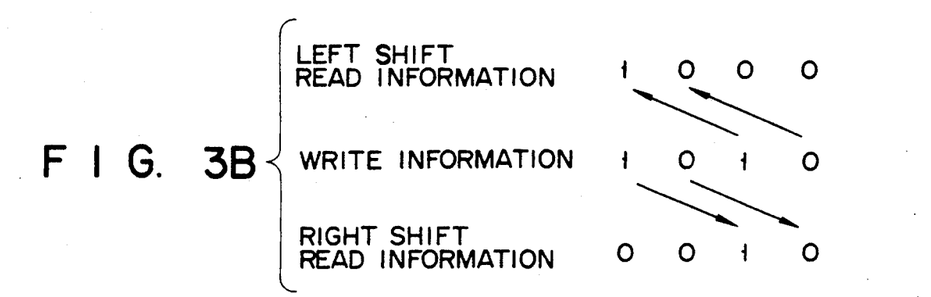
FIG. 3B is a diagram for use in explanation of the operation when the micro STM arithmetic circuit element of FIG. 1 is used as a shift register.

The micro STM arithmetic circuit element of FIG. 1 may be operated as a shift register. In this case, sets 24 and 26 of dummy information are set respectively before and behind written information 22 as is shown in FIG. 3A. The range from which information is to be read is shifted to the left or right with respect to the range into which information is to be written. For example, with two bits shifted to the right, the readout range comes to a right shift readout range indicated by reference numeral 30. With two bits shifted to the left, on the other hand, the readout range comes to a left shift readout range indicated by reference numeral 32. Thereby, the left shift or the right shift of the written information is made possible as is shown in FIG. 3B. Thereby, the left shift or the right shift of the written information is made possible as is shown in FIG. 3B. Therefore, a shift register circuit in which information can be read out in an arbitrary amount of shift can be arranged by counting the shift amount of the information readout range by means of clocks.

Figure 4A:
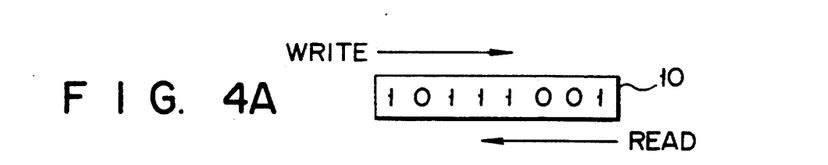
FIG. 4A is a diagram for explaining the direction in which information is written and the direction in which written information is read out when the micro STM arithmetic circuit device of FIG. 1 is used as an information reversing circuit.
Figure 4B:
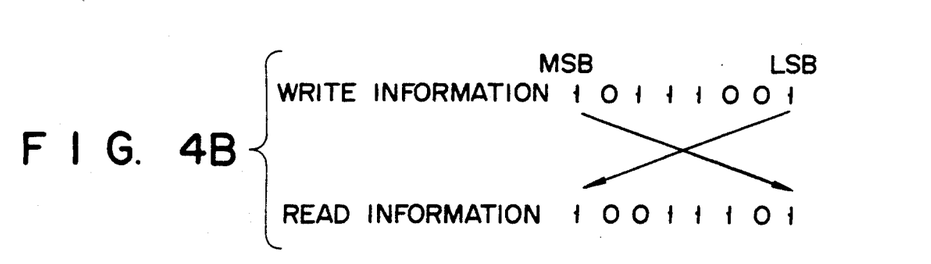
FIG. 4B is a diagram for use in explanation of the operation when the micro STM arithmetic circuit device of FIG. 1 is used as an information reversing circuit.

Moreover, the arrangement of FIG. 1 may be used as an information reversing circuit. In this case, the direction in which information is written and the direction in which the written information is read out are set to be opposite to each other as is shown in FIG. 4A. Thereby, as shown in FIG. 4B, the most significant bit (MSB) and least significant bit (LSB) sides in the write information and the read information are reversed. As a result, the information is reversed.

As described above, if probe 12 is made programmable in scanning operation, any of a sampling circuit, a shift register, and an information reversing circuit can be arranged by the use of the micro STM arithmetic circuit element shown in FIG. 1.

Figure 5A:
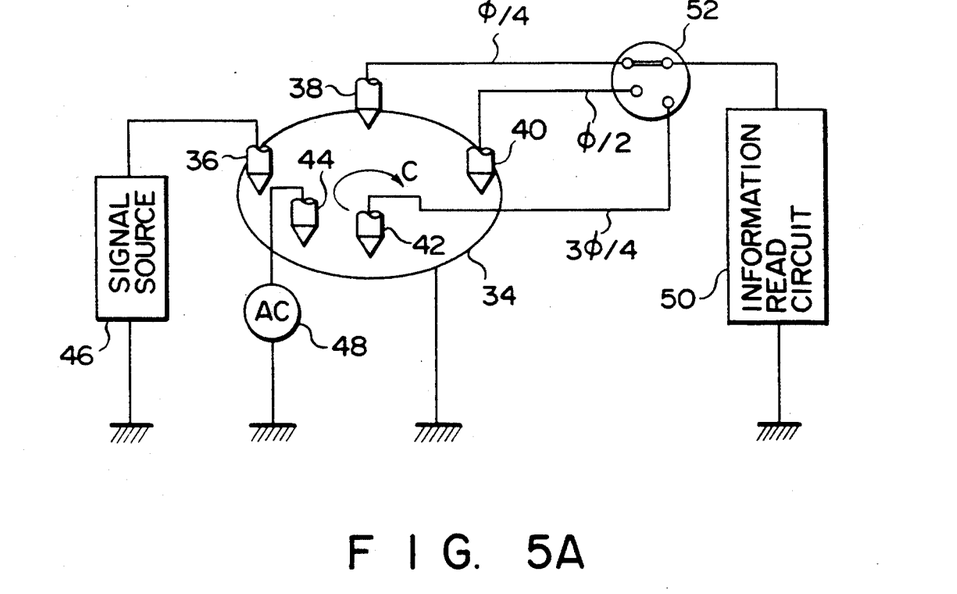
FIG. 5A is a schematic block diagram of a delay circuit according to another embodiment of the micro STM arithmetic circuit device of the present invention.
Figure 5B:
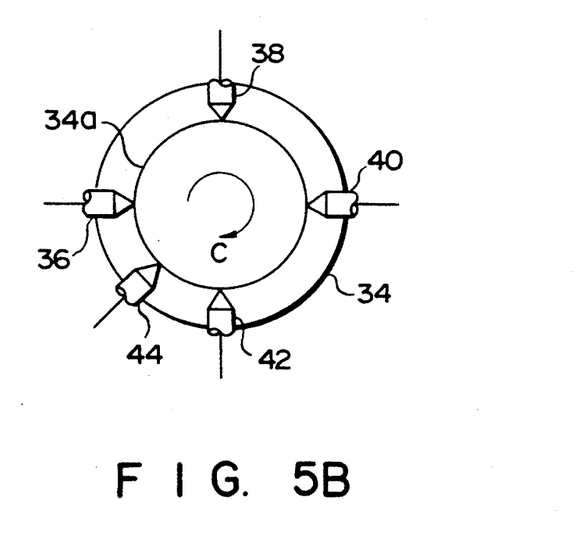
FIG. 5B an arrangement of a plurality of tunnel current probes in the delay circuit of FIG. 5A.

In addition, such a micro STM arithmetic circuit device using a micro STM as is shown in FIGS. 5A and 5B can be operated as a delay circuit. That is, in FIGS. 5A and 5B, an information-rewritable micro STM recording medium 34 is arranged so that it can be rotated in the direction of arrow C by, for example, an electrostatic motor not shown. Micro STM recording medium 34 is written by a tunnel current probe 36, read by tunnel current probes 38, 40, and 42 and erased by a tunnel current probe 44.

Tunnel current probes 36, 38, 40, 42, and 44 are disposed to scan an information track 34a with their distance to micro STM recording medium 34 held constant. Tunnel current probes 36 to 44 write, read, and erase information on rotating micro STM recording medium 34 at their respective locations.

Tunnel current probe 36 is connected to a signal source 46 and writes information from the source in a predetermined position of information track 34a of micro STM recording medium 34 as variations in tunnel current. Tunnel current probe 44 is connected to an alternating current source 48 to erase information recorded on micro STM recording medium 34. Tunnel current probes 38, 40, and 42 are disposed respectively in positions of $\phi/4$, $\phi/2$, and $3\phi/4$ with respect to writing probe 36. Probes 38, 40, and 42 are selectively connected to an information read circuit 50 via a change-over switch 52.

With this embodiment, when probe 38 is connected to information read circuit 50 via change-over switch 52, information recorded by probe 36 is read delayed by $\phi/4$ by means of probe 38. Likewise, the recorded information is read delayed by $\phi/2$ by means of probe 40 and by $3\phi/4$ by means of probe 42.

In this way, by properly selecting positions in which the readout probes are disposed, a delay circuit which is capable of varying or setting the timing of reading of information (the delay amount) can be formed of a micro STM arithmetic circuit device using the micro STM.

Figure 6:
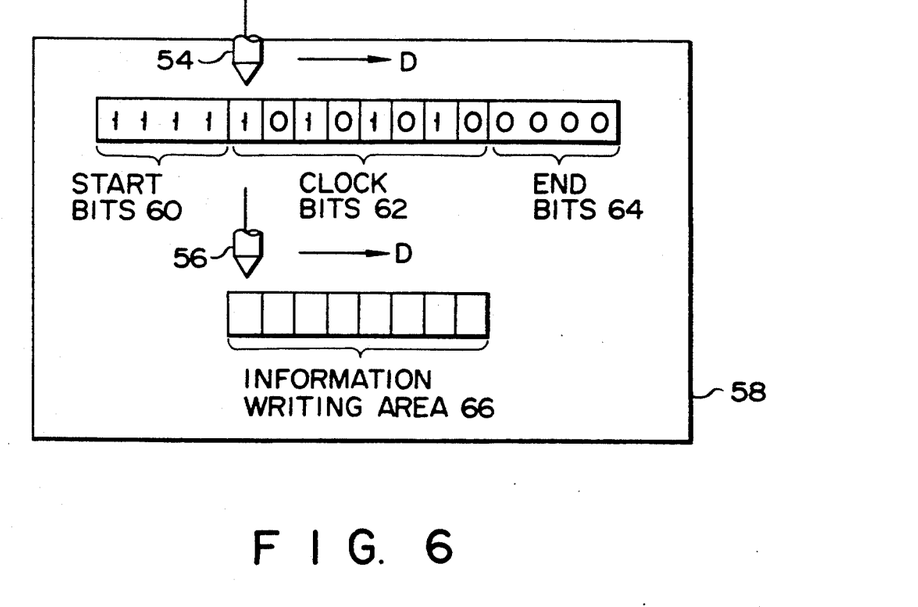
FIG. 6 is a diagram for use in explanation of the operation of an arithmetic circuit device using a clock signal according to still another embodiment of the micro STM arithmetic circuit device of the present invention.

FIG. 6 illustrates an example of a micro STM arithmetic circuit device using a clock signal. In this example, at least two tunnel current probes 54 and 56 are provided, one 54 being used for reading a clock signal and the other 56 being used for writing, reading, or erasing information.

Micro STM recording medium 58 is provided with clock signals in the order of start bits 60, clock bits 62, and end bits 64 for probe 54. Micro STM recording medium 58 is further provided with an information write area 66 for probe 56 in the position corresponding to clock bits 62. Probes 54 and 56 are shifted simultaneously in the direction of arrow D with the result that information is written onto information write area 66 by probe 56 in accordance with clock bits 62 read by probe 54. The reading and erasing of the information are performed in the same manner.

A plurality of probes may be provided for writing, reading, and erasing information on plural areas simultaneously in accordance with clock bits 62 following start bits 60.

Figure 7:
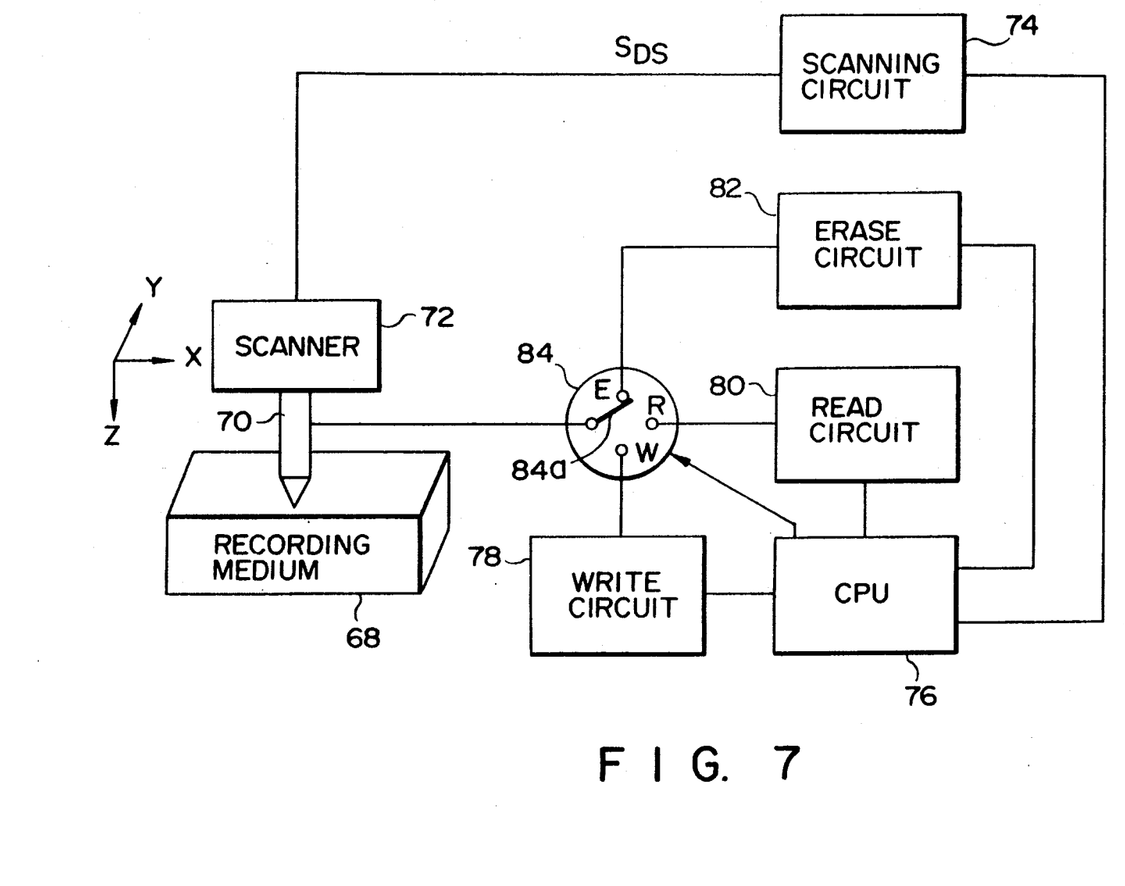
FIG. 7 is a block diagram of an embodiment of a micro STM recording apparatus which can write, read, and erase data on a micro STM recording medium, the micro STM recording apparatus being used for implementing the micro STM arithmetic circuit device of the present invention.

FIG. 7 illustrates a practical arrangement of a micro STM recording apparatus which is capable of writing, reading, and erasing data on a micro STM recording medium and used for constituting such a micro STM arithmetic circuit device as described above.

That is, a tunnel current probe 70 is disposed above a micro STM recording medium 68 at a certain distance therefrom. Probe 70 is supported by a scanner 72 so that it can be shifted in the X and Y directions. As scanner 72, a tripod type of scanner, a tube scanner or a known small distance moving mechanism using a piezoelectric element may be used. Such a scanner 72 is connected to a scanning circuit 74. Responsive to signals from a CPU 76, scanning circuit 74 provides an output signal $S_{DS}$ used for moving scanner 72 in the X and Y directions, or in the X, Y, and Z directions.

Probe 70 is selectively connected via a switch 84 to one of a write circuit 78, a read circuit 80, and an erase circuit 82 which are all connected to CPU 76. To write data onto micro STM recording medium 68, switch 84 has its moving contact 84a placed in the write (W) position. Thereby, a data signal externally applied to CPU 76 is transferred to probe 70 as a write signal via write circuit 78. To read data, switch 84 has its moving contact placed in the read (R) position. Thereby, read circuit 80 reads a tunnel current flowing according to data recorded on micro STM recording medium 68 and feeds the result into CPU 76 as an output signal. To erase data recorded on micro STM recording medium 68, moving contact 84 a of switch 84 is placed in the erase (E) position. Responsive to an erase signal from CPU 76, erase circuit 82 operates to erase data on recording medium 68. Erase circuit 82 is excluded in the case of "WRITE ONCE" recording system.

Switch 84 may be either of a mechanical type or of an electrical type and its switching operation is controlled by CPU 76. Scanning circuit 74 is responsive to signals from CPU 76 to cause probe 70 to scan micro STM recording medium 68 in the X and Y directions or in the X, Y, and Z directions at the time of writing, reading, or erasing of information.

As described above, by using a micro STM as a recording apparatus and temporarily storing information on an associated recording medium, many circuits involving a step of temporality storing information can be implemented.

In the above embodiments, the circuits each having temporal storage areas using the micro STM were described taking the sampling circuit, the shift register circuit, the information reversing circuit, and the delay circuit as examples. In addition to those exemplary circuits, the circuits may include a buffer circuit followed by an arithmetic process, a dual port RAM, etc.

Figure 8A:
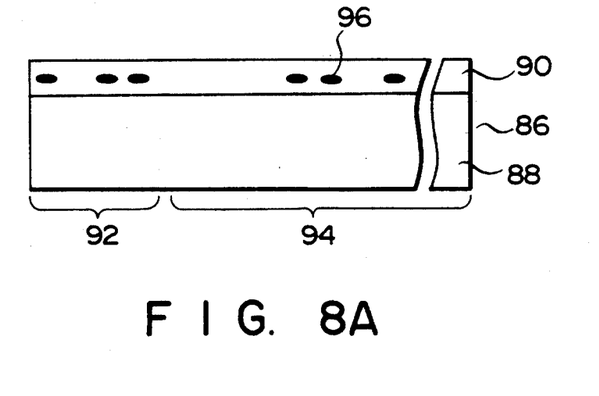
FIGS. 8A and 8B are a sectional view and a plan view of an embodiment of the micro STM recording medium of the present invention.

Next, a suitable recording format for such a micro STM recording apparatus using the micro STM as is shown in FIG. 7 will be described. That is, FIG. 8 is a sectional view of micro STM recording medium 86 used with such a micro STM recording apparatus. In this Figure, hatching is excluded for easier viewing. Likewise, hatching is excluded from sectional views.

Figure 8B:
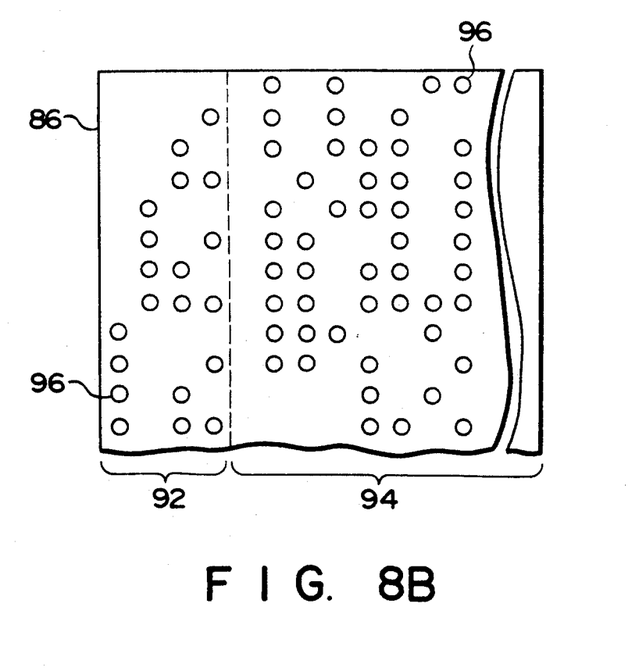

As is shown in FIG. 8A, micro STM recording medium 86 is formed of a conductor 88 consisting of, for example, Si (N type) and a recording layer (insulating layer) 90 formed on conductor 88, recording layer consisting of, for example, $SiO_2$ and $Si_3N_4$ laminated up to a thickness of several angstroms to some hundreds of angstroms. Micro STM recording medium 86 has its information recording area separated into an address area 92 in which address information is recorded and a data area 94 in which data is recorded as is shown in FIGS. 8A and 8B. Therefore, the reading of data corresponding to arbitrary address information enables random reproduction of information.

Probe 70 (FIG. 7) is placed at a certain distance from micro STM recording medium 86. A first direct current voltage $V_{B1}$ ranging from some tens of volts to some hundreds of volts from write circuit 78 (FIG. 7) is applied from probe 70 to the surface of the recording medium in the form of pulses or continuously while the medium is scanned by the probe with the result that electric charges 96 are trapped by recording layer 90 as shown. The recording (writing) of data onto data area 94 is performed in the form of the presence or absence of trapped electric charges 96. To read data, tunnel current probe 70 is placed at a certain distance from recording medium 86 and a second direct current voltage $V_{B2}$ ($V_{B2} < V_{B1}$) ranging from one volt to 50 volts is applied from probe 70 to the surface of recording medium 86 by a bias voltage supply circuit (not shown) in read circuit 80 (FIG. 7) while the medium is scanned by the probe. Then, the effective bias voltage between tunnel current probe 70 and recording medium 86 varies according to the presence or absence of trapped electric charges 96 so that a tunnel current obtained from probe 70 varies. By reading variations in the tunnel current, address information in address area 92 and data in data area 94 are reproduced.

The tunnel current $I_T$ obtained from probe 70 while the medium is scanned by the probe varies with the thickness (information on irregularities) of recording layer 90, the work function of substance (the kind of atom) $\phi$, or the electric charges (effective bias voltage) V trapped by recording layer 90 (or its function f(V)). That is, tunnel current $I_T$ is given by $$I_T \propto f(V) \exp(-\sqrt{\phi} \cdot s)$$

The address information can be formed of information that is difficult to write by data recording means or noises similar to it or that is refreshed. That is, a micro STM recording medium which has high data integrity can be formed. This can be accomplished if the address information is recorded in such a form as there is little possibility of destruction by unpredictable unwanted electrical noises or by overwriting of information or in such a form as to facilitate refreshing operation. Such a form of the address information is made of information on irregularities, a combination of a plurality of substances with different work functions, a combination of the information on irregularities and the substances, mechanical information or information on substances.

The refreshing operation may be performed by flowing an AC current between probe 70 and recording medium 86 by erase circuit 82 (FIG. 7) or irradiating the recording medium with ultraviolet rays.

Figure 9:
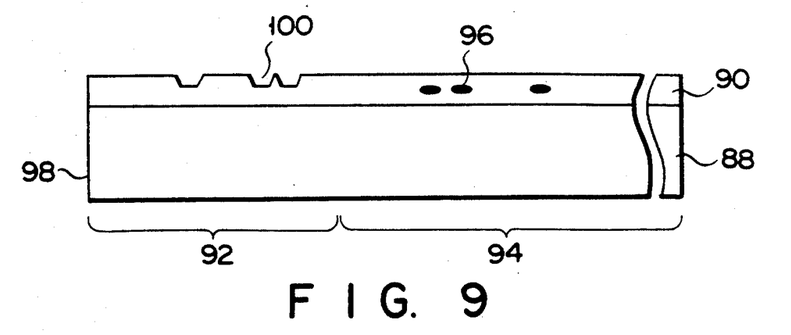
FIGS. 9 through 12 are sectional views of other embodiments of the micro STM recording medium of the present invention.

FIG. 9 illustrates a micro STM recording medium 98 in which address information 100 consisting of irregularities (information recorded in a different way from data) is formed on the surface of recording layer 90 corresponding to address area 92. In this case, there is a difference in distance between the surface of recording medium 98 and conductor 88 because of the irregularities, namely a difference in thickness is made in recording layer 90. Thereby, the thickness of recording medium 90 in the above expression is varied. Thus, variations appear in the flowing tunnel current $I_T$, thereby recognizing the address information. Address information 100 may be formed by protruding recording layer 90 corresponding to address area 92 from the surface of the micro STM recording medium.

Figure 10:
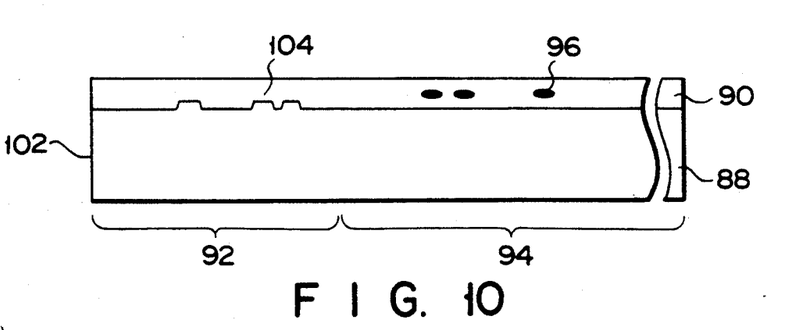

FIG. 10 illustrates a micro STM recording medium 102 in which at the junction between recording layer 90 corresponding to address area 92 and conductor 88 is formed address information 104 consisting of irregularities and formed in a different way from data information. In this case as well, as is the case with FIG. 9, a difference is produced in distance between the surface of recording medium 102 and conductor 88 due to the irregularities of the address information. Thus, a difference is produced between tunnel barriers, causing tunnel current $I_T$ to vary. Address information 104 may be formed such that recording layer 90 protrudes into conductor 88 or conductor 88 protrudes up to or from the surface of the recording medium.

Figure 11:
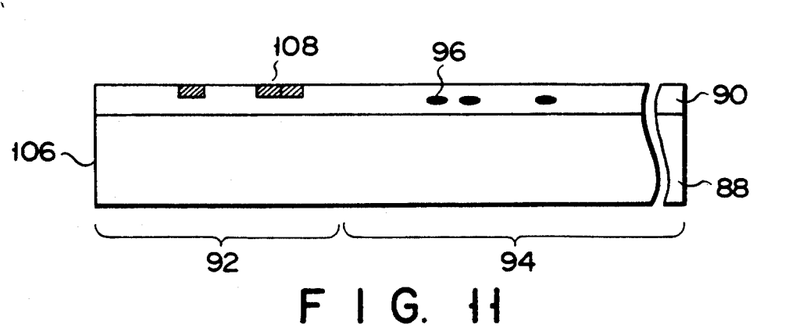

FIG. 11 illustrates micro STM recording medium 106 in which materials with different work functions are embedded in recording layer 90 corresponding to address area 92, thereby to form address information 108 that cannot be renewed. In this case, there is a difference in work function between the address information parts and the other parts of recording layer 90. Since the work function $\phi$ in the above expression varies, tunnel current $I_T$ varies.

Figure 12:
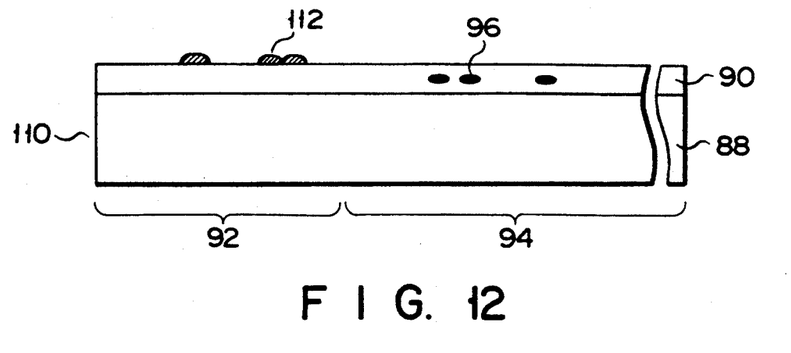

FIG. 12 illustrates a micro STM recording medium 110 in which irregularities are provided on the surface of recording medium 90 corresponding to address area 92 with materials having different work functions, thereby to form address information 112 that cannot be changed. In this case, there are differences in thickness and work function between the address information part and the other part of the recording layer 90, thus causing variations in tunnel current $I_T$. Address information 112 can be formed, for example, by decomposing and depositing gas in a gaseous atmosphere with current from probe 70.

In each of the recording mediums shown in FIGS. 9 to 12, data information is electrical (plus or minus) information. Therefore, electric charges 96 trapped by recording layer 90 may be affected by electromagnetic wave noise or radiation so that data is changed. Also, data may be overwritten because of failures or malfunctions of the recording apparatus. Even in such a case, however, address information 100, 104, 108, and 112 in address area 92 is little affected by electrical noise. The probability of alteration of data due to mechanical noise involving a collision between the tunnel current probe and the recording medium is small as compared with that of alteration of data due to electrical noise. Even if data is altered by electrical noise, refreshing can be performed by means of flowing an AC current. Hence, data area 94 corresponding to address information can surely be retrieved.

As for readout of information, where the signal processing system contains a low pass filter, a variation in the tunnel current may easily be detected at a boundary between materials as in the case of the address part of recording medium 106 of FIG. 11. The micro STM recording apparatus of the present invention can use the method of processing read data as needed.

Figure 13:
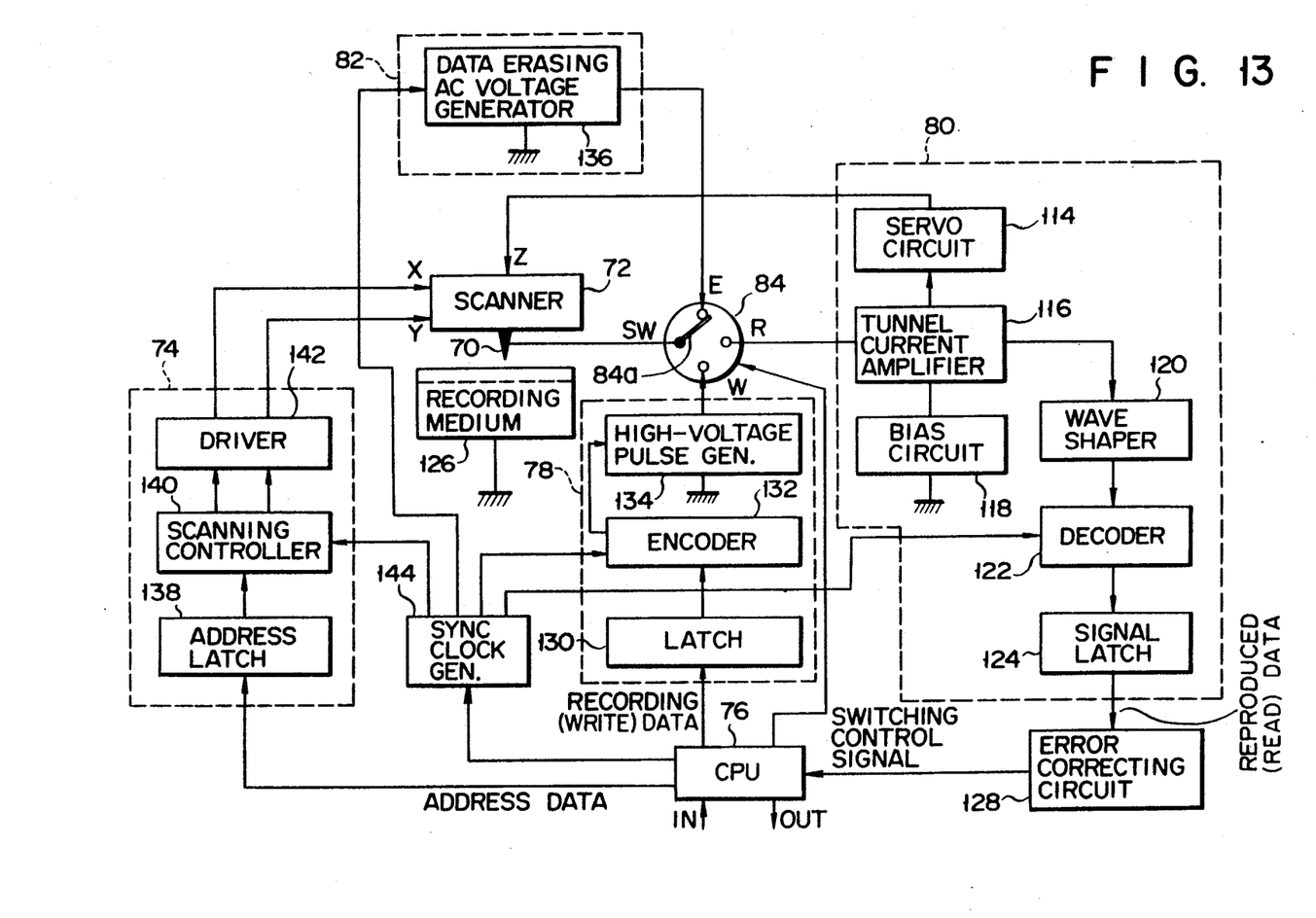
FIG. 13 is a block diagram illustrating a specific arrangement of the micro STM recording apparatus of the present invention.

FIG. 13 illustrates a detailed arrangement of the micro STM recording apparatus which writes, reads, and erases data information on micro STM recording mediums 86, 98, 102, 106, and 110 each having address area 92 and data area 94 (FIGS. 8A-12). This micro STM recording apparatus is essentially the same as the apparatus of FIG. 7 and thus, of course, can also be applied to the micro STM arithmetic circuit device described previously.

Read circuit 80 comprises a servo circuit 114, a tunnel current amplifier 116, a bias circuit 118, a wave shaper 120, a decoder 122, and a signal latch 124. Tunnel current amplifier 116 has its one end connected to the "R" terminal of a switch 84 and amplifies a tunnel current flowing between probe 70 and micro STM recording medium 126 (which takes any one of the forms of micro STM recording mediums 86, 98, 102, 106, and 110). An amplified signal is applied to wave shaper 120 where it is shaped so as to be read as a digital signal and then entered into decoder 122. Decoder 122 demodulates the entered data which was recorded modulated and applies an output signal to signal latch 124 where the output signal is stored temporarily. Signal latch 124 is connected to CPU 76 via an error correcting circuit 128.

Bias circuit 118 is connected to tunnel current amplifier 116 to apply a bias voltage for generating a tunnel voltage between probe 70 and recording medium 126. Servo circuit 114 has an end connected to a scanner 72 and the other end connected to tunnel current amplifier 116. Servo circuit 114 adjusts the height of probe 70 in the Z direction to avoid contact with recording medium 126.

Write circuit 78 comprises a latch 130, an encoder 132, and a high-voltage pulse generator 134. Recording data externally applied to CPU 76 through a computer keyboard (not shown) is applied from CPU 76 to latch 130. Encoder 132 has an end connected to latch 130 and the other end connected to high-voltage pulse generator 134. The recording data from latch 130 is modulated by encoder 132 and then converted to a high-voltage pulse by high-voltage pulse generator 134 for application to the "W" terminal of switch 84.

Erase circuit 82 comprises a data erasing AC voltage generator 136, which has a end connected to the "E" terminal of switch 84. AC voltage generator 136 generates an AC voltage equal in amplitude to a high voltage at the time of writing of data. The AC voltage is applied to probe 70 to erase data on recording medium 126.

Scanning circuit 74 comprises an address latch 138, a scanning controller 140, and a driver 142. Address latch 138 has an end connected to CPU 76 and the other end connected to scanning controller 140. Address latch 138 latches address data output from CPU 76. Scanning controller 140 is connected to driver 142 and responds to an output signal of address latch 138 to generate X and Y scanning signals which in turn are applied to driver 142. Driver 142 is connected to scanner 72 to drive it in response to the scanning signals from scanning controller 140.

A sync clock generator 144 is connected to decoder 122, encoder 132, data erasing AC voltage generator 136, and scanning controller 140 to synchronize read, write, erase, and scan operations. Sync clock generator 144 is connected to CPU 76 for timing control of clock generation.

Switch 84 is connected to CPU 76 to receive a switching control signal therefrom. Probe 70 is selectively connected to one of the terminals "E", "R", and "W" of switch 84 by the switching control signal from CPU 76.

Error correcting circuit 128 is disposed between signal latch 124 and CPU 76, which corrects errors which might be contained in reproduced data and supplies error-free reproduced data to CPU 76.

The operation of the micro STM recording apparatus arranged as described above will be described below.

First, to read recorded information, the moving contact 84a of switch 84 is placed in the "R" position to form an STM basic circuit comprised of micro STM recording medium 126, probe 70, switch 84, tunnel current amplifier 116, and bias circuit 118, and a tunnel current flowing between probe 70 and recording medium 126 is amplified and current-to-voltage converted by tunnel current amplifier 116.

Here, the tunnel current flowing between probe 70 and recording medium 126 is on the order of 0.01 nA to 10 nA, which depends on the thickness of recording layer (insulating layer) 90 on recording medium 126 or the distance between probe 70 and recording medium 126. The bias voltage supplied from bias circuit 118 is generally on the order of 1 V to 50 V. A readout signal amplified and current-to-voltage converted by tunnel current amplifier 116 is wave shaped by wave shaper 120 into a form that can be read as a digital signal and then applied to decoder 122 and signal latch 124, which are digital circuits, to obtain reproduced data.

Recording medium 126 has insulating recording layer 90 of a thickness ranging from several angstroms to 100 angstroms. Thus, as compared with a case where a metal sample is measured using a usual STM, the distance between probe 70 and recording medium 126 becomes very small when the same magnitude of tunnel current is measured with the bias voltage set equally. This will increase the possibility of collisions between probe 70 and recording medium 126, thus damaging recording medium 126 and rounding the tip of probe 70. To avoid such collisions, therefore, the position of probe 70 in the Z direction is controlled by servo circuit 114. The time constant of servo circuit 114 is set taking the unit size and recording pitch of recorded data or the reading speed (scanning speed of the scanner) into account. With the apparatus of FIG. 13, since digital signals are used as recorded information, the time constant is set so slow that "1" and "0" can be distinguished from each other.

It is expected that the unit size of recorded data on recording medium 126 is incomparably small, say some tens of angstroms to some hundreds of angstroms. Assume that a piece of data is recorded within a region 100 angstroms square and data is recorded within a record region of 1 $\mu m \times 0.1$ $\mu m$. Then, information of 1 Kbit ($100 \times 10 = 1,000$) can be recorded within the record region. Where a piece of data is recorded within a region 30 angstroms square and data is recorded within a record region of 10 $\mu m \times 10$ $\mu m$, extreme high-density recording of about 1 megabyte ($9 \times 1,000 \times 1,000 = 9,000,000$ bits) will be achieved.

The read operation is based on first identifying address data written in address area 92 of recording medium 126 and subsequently reading and outputting data written in a desired part of data area 94.

As is the case with other recording mediums such as magnetic disks, optical disks, and optical cards, there are a sequential file recording system and a random access file recording system. In the recording system of the present invention utilizing STM, the recording density depends largely o the scanning range of scanner 72. In the case of the micro STM, the scanning range is 1 $\mu m \times 0.1$ $\mu m$ at most as described above. Since the recording density is not so great the sequential file system is preferred. If a tube scanner were used to scan 10 $\mu m \times 10$ $\mu m$ for larger recording density, the random access file system would be preferred.

In the case of a recording system using STM, a general STM detects information on surface irregularities in a square region while scanning a two-dimensional plane. Thus, the recording system for STM is closer to that for magnetic disks, optical disks, or optical cards in which information is written two-dimensionally than to that for magnetic tape in which information is written one-dimensionally. Among the formers, the recording system of optical cards is closest to the recording system of STM. The recording system of optical cards includes sequential file and random access file systems. In any system, a record area corresponding to one scanning line in the X direction forms one track and track numbers allocated to tracks are used addresses, thus improving the efficiency of retrieving of data. The recording system using STM corresponds to that of optical cards and data retrieval time can be shortened by provision of address data in any of the sequential file system and the random access file system.

Where a random access file has a recording capacity of 100 tracks, tracks numbered, for example, one to ten store information, called a index, table, or directory, indicating what sort of data is stored in what address. When a read instruction is issued from CPU 76, the tracks numbered one to ten are first scanned to find an address in which desired information is stored and the address area of tracks numbered from 11 to 100 is scanned next to specify the location of the address. Finally, data following the address is read and output to CPU 76. As can be seen, the provision of address data obviates the need of scanning the entire recording medium to retrieve certain information, thus shortening the retrieval time.

In addition, in the case of the STM recording system in which information is read as variations in flowing current, the tunnel current varies not only with the presence or absence of electric charges on the recording medium but also with the configurations of irregularities and the work functions of materials and thus may be regarded as information similar to electrical charge information. For this reason, if the address data is represented by the configurations of irregularities or a difference between work functions of different materials, the address data can be refreshed by the erase circuit even if the address data is changed by physical mean of current used for writing and reading data. Thereby, it becomes possible to avoid the information-unreadable worst case in which data in the address part is abnormal even though data in the data part is normal. That is, a micro STM recording medium and a micro STM recording apparatus can be provided which are high in data integrity.

In the case of the sequential file, information is written on a time series basis and is read sequentially starting from the beginning or from the end. Here assume that the sequence file has address information of the track number level. Then, if the track number of information once retrieved is memorized, the need for retrieval of data from its end is obviated. This permits direct access to desired data. In other words, retrieval time can be shortened. If track numbers corresponding to address numbers were previously written on recording medium 126 with irregularities or different materials of the recording medium, not with the presence or absence of electric charges 96, a micro STM recording medium with high data integrity and a micro STM recording apparatus therefor could be obtained.

In particular, if address information is written on recording medium 126 with irregularities or different materials, and the address information is refreshed (noise eliminating operation) once before use or sometimes during use to eliminate electric charges remaining in address area 92 as noise, the address information will become higher in integrity. The refreshing operation is performed by erase circuit 82 to clear electric charge noise. As a result, only the address information based on the irregularities or different materials of recording medium 126 remains and thereafter the address information can be read surely.

To write information, the basic circuit is constructed by recording medium 126, probe 70, switch 84, and high-voltage pulse generator 134. Data transmitted from CPU 76 via latch 130 and encoder 132 is entered into high-voltage pulse generator 134. This causes high-voltage pulse generator 134 to generate a high voltage according to the data signal and a pulse current to flow between probe 70 and recording medium 126. As a result, electric charges are charged or trapped on the surface of or inside the recording layer of recording medium 126 so that the data is recorded. At this point, the current flowing between probe 70 and recording medium 126 need not be tunnel current but may be current in field emission region. However, the current should be greater than the tunnel current at the time of reading of recorded information. Therefore, a high-voltage pulse signal generated by high-voltage pulse generator 134 is raised up to some tens of volts to some hundreds of volts.

The write operation is based on searching data area 94 in which information is not written yet or address area 92 and writing data transmitted from CPU 76 in data area 94.

That is, in the initial stage of the write operation, read circuit 80 is operated and then write circuit 78 is operated. If circumstances require, in order to verify whether the written information is correct actually, an additional operation may be performed in which read circuit 80 is operated again and the read information is compared with the data from CPU 76.

Even in the write operation, if verification is made as to whether data information follows address information, a location where data is to be written anew can be found within a short time.

To erase information, the basic circuit is constructed by data erasing AC voltage generator 136, switch 84, probe 70, and recording medium 126. Information can be erased by flowing AC current between probe 70 and recording medium 126. At this point, the amplitude of the AC current is made approximately equal to that of the DC current which flows between probe 70 and recording medium 126 in accordance with a high voltage generated by high-voltage pulse generator 134 at the time of writing of data. The frequency of the AC current should be high as compared with the information reading or writing frequency which depends on the scanning speed of probe 70. Usually, a frequency which is 10 or more times as high as the reading or writing frequency is selected.

Also, in erasing information, an area to be erased can be specified within a short time because of address information. Thus, the separation into address area 92 and data area 94 is effective. If address information is recorded by means of irregularities or different materials of recording medium 126, the address information will never be erased by malfunction of scanning. Thus, the next read operation or write operation can be performed rapidly.

With the micro STM recording apparatus of FIG. 13, it is required to precisely control the timing of writing, reading, and erasing of information. The fine adjustment of timing is governed by sync clock generator 144 and the coarse control for the overall flow of operations is performed by CPU 76.

It is desired that the scanning speed of probe 70 remain unchanged in each of write, read, and erase operations. However, the scanning speed may be changed.

To increase the recording density of information, it is desired that information be written at a scanning speed which is slower than that at the time of reading. For example, where the pulse width of high-voltage pulse supplied from high-voltage pulse generator 134 is 1 msec, a scanning speed of 10 m/sec or below is required to write a piece of information into an area 100 Å square. To write information into an area of 1 $\mu$m×0.1 $\mu$m, therefore, if scanning is made along the long side (1 $\mu$m), then the scanning frequency will be about 10 Hz, and the information writing speed will be 1 Kbit/sec when a piece of information is written into an area 100 angstroms square.

It is possible to make the scanning speed at the time of reading faster than that at the time of writing. The natural vibration frequency of scanner 72 is the measure of the upper limit of the scanning speed. In general, a small fraction of the natural vibration frequency is selected. In the case of the micro STM, its natural vibration frequency is about 10 KHz. Consequently, the scanning frequency at the time of reading becomes about 1 KHz. Assuming that pieces of information each of 100

Å×100 Å are written in a scanning width of 1 μm, up to 100 Kbit/sec reading speed will be achieved.

As described in detail, according to the present invention, a micro STM arithmetic circuit element can be provided which is capable of constituting circuits having large temporal storage areas, by the use of a micro STM as a recording apparatus, by temporarily storing information on a recording medium used with the recording apparatus, and by the utilization of an incomparable high recording density of the STM.

Moreover, according to the present invention, a micro STM recording apparatus and a micro STM recording medium therefor can be provided which permit random access to data information, easy control for retrieving address information and improvement of retrieval speed because the record format is specified for the micro STM recording medium provided with an address area in which address information is recorded and a data area in which data information is recorded.

In addition, a micro STM recording apparatus and a micro STM recording medium therefor can be provided which are improved in data integrity by making address information difficult to change or by allowing the address information to be refreshed.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An apparatus comprising:
   a rewritable recording medium having a large capacity recording region for storing information, said recording medium including a small capacity recording region for temporarily storing information;
   probe means for writing and reading information to and from said recording medium, respectively;
   scanning means for driving said probe means to vary a relative position between said probe means and said recording medium;
   an information generator including means for generating information;
   information writing means for changing a voltage applied between said probe means and said recording medium in accordance with said information from said information generator to write the information from said information generator in the small capacity recording region of said recording medium by means of said probe means;
   information reading means for changing a voltage applied between said probe means and said recording medium to read out said information from the small capacity recording region of said recording medium by means of said probe means; and
   control means for controlling a writing cycle of said information writing means and a reading cycle of said information reading means based on a selected arithmetic operation, and for controlling said scanning means.

2. The apparatus according to claim 1, wherein said arithmetic operation is sampling of information, and said control means comprises
   writing means for controlling said scanning means and said information writing means to write said information from said information generator in the small capacity recording region of said recording medium at a first timing of a predetermined cycle, and
   reading means for controlling said scanning means and said information reading means to read out said information from the small capacity recording region of said recording medium at a second timing of the predetermined cycle.

3. The apparatus according to claim 1, wherein said arithmetic operation is shift of information, and said control means comprises
   writing means for controlling said scanning means and said information writing means to write said information from said information generator in a predetermined position of the small capacity recording region of said recording medium and to write predetermined information in designated positions before and after said predetermined position, and
   reading means for controlling said scanning means and said information reading means to read out information from said predetermined position of the small capacity region of said recording medium and from at least one of said designates positions before and after the predetermined position based on an amount and a direction of information to be shifted.

4. The apparatus according to claim 1, wherein said arithmetic operation is reversal of information, and said control means comprises
   writing means for controlling said scanning means to drive said probe means in a first direction and for controlling said information writing means to write said information from said information generator in the small capacity recording region of said recording medium, and
   reading means for controlling said scanning means to drive said probe means in a second direction opposite to said first direction, and for controlling said information reading means to read out said information from the small capacity recording region of said recording medium.

5. The apparatus according to claim 1, wherein said arithmetic operation is delay of information, said probe means comprises an information writing first probe and an information reading second probe which are arranged with a space therebetween sized according to a predetermined amount of delay, said scanning means comprises means for driving said first and second probes to scan said recording medium simultaneously, and
   said control means comprises writing means for controlling said scanning means and said information writing means to write said information from said information generator in the small capacity recording region of said recording medium using said first probe, and reading means for controlling said scanning means and said information reading means to read out said information from the small capacity recording region of said recording medium using said second probe.

6. The apparatus according to claim 1, wherein said small capacity recording region of said recording medium comprises a first region for temporarily storing said information from said information generator and a second region for recording clock information, said probe means comprises a first probe (56) (for writing and reading information to and from said first region, respectively, and a second probe (54) for reading the clock information from said second region, and said control means comprises writing means for controlling said information writing mean sand said information reading means to write said information from said information generator in said first region of the small capacity recording region of said recording medium using said first probe based on the clock information read out by said second probe and reading means for controlling said scanning means and said information reading means to read out said information from said first region of the small capacity recording region of said recording medium using said first probe based on the clock information read out by said second probe.

7. The apparatus according to claim 1, wherein said arithmetic operation is generation of an address, said small capacity recording region of said recording medium is a region for recording address information, said probe means comprises a first probe for reading out the address information and a second probe for reading out the information from the large capacity recording region of said recording medium, and said control means comprises reading means for controlling said scanning means and said information reading means to read out the address information from the small capacity recording region of said recording medium using said second probe and reading means for reading the out information from the large capacity recording region of said recording medium using said first probe based on the address information read out by said second probe.

* * * * *